July 24, 1956 D. J. BRAAK 2,756,328
AUDIO-NOISE RESPONSIVE SQUELCH CIRCUIT
Filed May 1, 1952
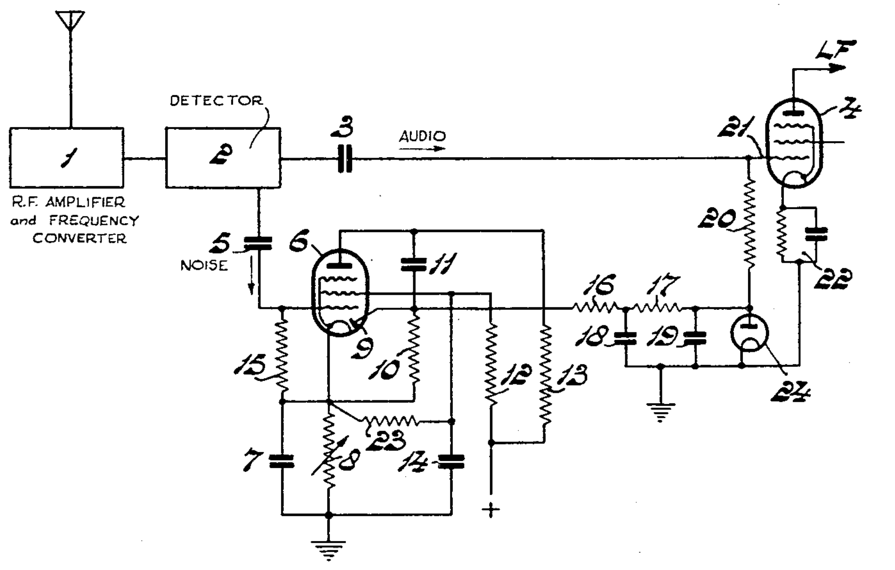
INVENTOR
Dirk Johan Braak
BY Fred M Vogel
AGENT 2,756,328

AUDIO-NOISE RESPONSIVE SQUELCH CIRCUIT

Dirk Johan Braak, Hilversum, Netherlands, assignor to Hartford National Bank and Trust Company, Hartford, Conn., as trustee Application May 1, 1952, Serial No. 285,433

Claims priority, application Netherlands June 27, 1951

4 Claims. (Cl. 250—20)

The present invention concerns audio-noise responsive squelch circuits. More particularly, the invention relates to circuit-arrangements for suppressing the noise in wireless receivers which occurs in the absence of a signal or during very weak signals.

Many noise suppressing circuit-arrangements are already known. In most of these circuit-arrangements the main receiving channel, and more often the low-frequency part thereof, comprises a controlled discharge tube which, in the absence of a signal in the input circuit of the receiver or if the signal is unduly weak, is made inoperative due to a high negative voltage being applied to a grid of said tube. The occurrence of a signal voltage in the input circuit may cause the said negative voltage to be compensated by a positive voltage which may be produced, for example, by an auxiliary amplifying tube, so that normal reception may take place.

In receivers for frequency-modulated oscillations, a direct voltage derived from the noise voltages by amplification and detection may frequently be used to block the main channel in the absence of a signal. This utilizes the principle that in the presence of a signal voltage the level of the noise voltages in the output circuit decreases as a result of the limiting elements becoming operative, so that the blocking voltage decreases. In such receivers use may be made of a separate noise voltage amplifier, which also serves as a detector and which produces anode current in the absence of a signal. Its anode circuit comprises a resistance which also forms part of the grid circuit of the channel blocking amplifier tube and which supplies a negative grid-bias. The control grid of the noise amplifying tube in the known circuits may also be subject to the action of a direct voltage dependent upon the signal voltage. The use of a separate diode detector for detecting the amplifier noise voltages has also been suggested.

The object of the present invention is to provide a circuit-arrangement for suppressing noise in wireless receivers. Small variations in the rectified, amplified noise voltages provide a variation in the biassing potential of the blocking tube or tubes which is sufficient to bring about a complete change of said tube, from the blocked, or non-conducting condition, to the unblocked, or conducting condition.

In accordance with the present invention, in a circuit-arrangement for suppressing noise in a wireless receiver, noise voltages from a receiving channel are supplied to the control grid of a noise amplifying tube. In the absence of a signal, the rectified output voltage of the noise amplifying tube is active at the grid of each of one or more discharge tubes included in a further receiving channel to block said channel. The circuit-arrangement is so comprised that the level of the noise voltages decreases upon occurrence of a signal voltage and said further receiving channel is unblocked. In the circuit-arrangement, a first resistance across which the rectified output voltage of the noise amplifying tube is set up, is connected in series with a source supplying a substantially constant direct voltage which counteracts the said rectified output voltage in the circuit of the grid of each said discharge tube.

The aforementioned voltage source is preferably constituted by a second resistance included between the cathode of the noise amplifying tube and a point of constant potential (ground), so that it is traversed by the cathode current of said tube. It is advantageous to rectify the noise voltage amplified in the noise amplifying tube by means of a diode circuit including a third resistance connected in series with the first resistance between the point of constant potential (ground) and the grid of each blocking tube in the further receiving channel. In this case, a diode-pentode, or a pentode comprising an additional electrode which is active as a diode-anode, may be utilized as the noise amplifying tube.

In order to prevent the grid of the blocking discharge tube in the further channel from acquiring an unduly high positive voltage, as a result of which grid currents and distortion might occur, provision may be made of a limiter diode which becomes current-conductive in the case of an unduly high voltage of the said grid to counteract the increase in grid voltage.

In order that the invention may be readily carried into effect, it will now be described in greater detail with reference to the accompanying drawing, wherein the figure is a schematic diagram of an embodiment of the circuit arrangement of the present invention.

In the figure, an input circuit 1, which may comprise, for example, one or more high-frequency amplifying stages and a frequency-conversion stage. The intermediate-frequency output voltages thereof are supplied to a device 2, which comprises a frequency detector in the case of reception of frequency-modulated oscillations and an amplitude detector in the case of amplitude-modulated oscillations. The low-frequency output voltages of the device 2 are supplied by way of a condenser 3 to the first control grid of a low-frequency amplifying tube 4, which is shown as a pentode. The amplified low-frequency oscillations are supplied, if necessary, by way of further amplifying stages to an output stage. The device 2 may comprise automatic volume control known as such.

Strong noise voltages occur in the output circuit of device 2 in the absence of a signal. In order to suppress the noise voltage it is supplied by way of a condenser 5 to the first control-grid of a noise amplifying tube 6. In a manner utilizing the tube 6 described hereinafter, in the absence of a signal, and hence when the noise voltages are at a maximum, the first control grid of the low frequency amplifying tube 4 has applied to it a negative potential such that the tube 4 becomes inoperative.

Condenser 5 preferably has a comparatively low capacity of, for example, some tens of micro-microfarads, a resistance 15 of about 0.1 megohm being provided between the control grid and the cathode of the tube 6. The condenser 5 thus substantially passes the frequencies located above the audible range. It could be replaced by a high-pass filter. The amplified noise voltages are supplied by way of a condenser 11 to a diode-anode 9, which utilizes a common cathode with the pentode-portion of tube 6. Consequently, a direct voltage, which is dependent upon the amplitude of the noise voltages, is set up across the resistance 10 included between the cathode and the anode 9 of the tube 6. Furthermore, the parallel combination of condenser 7 and resistor 8, the latter preferably being variable, is provided between the cathode and ground.

The pentode anode lead includes a resistor 13 and the screen-grid lead includes a resistor 12, decoupled by means of a condenser 14.

The direct voltage with respect to ground set up at the diode 9 is the difference between two voltages, of which one is produced by the cathode current through the resistor 8 and the other is due to the rectified noise voltage set up across the resistance 10. Said voltages counteract one another. The proportioning is such that, in the absence of a signal, the voltage across the resistance 10 is somewhat higher than that across the resistance 8; both voltages may in this case amount to some tens of volts. The difference voltage is supplied by way of a filter constituted by resistances 16 and 17 and condensers 18 and 19, and by way of a grid resistance 20 to the first control-grid of the low-frequency amplifying tube 4, which is thus blocked. The cathode lead of the tube 4 may include the parallel combination 22 of a resistance and a condenser, in order to provide the correct biasing potential for the control grid.

When a signal voltage occurs in the input circuit of the arrangement of the present invention, due to which the noise voltage decreases, the voltage at the resistance 8, so far as the action upon the control grid of the tube 4 is concerned, exceeds the voltage at the resistance 10, which in the meantime decreases. Consequently, the biasing potestial of the control grid of tube 4, which at first has a negative value such that the tube is blocked, decreases so that said tube normally becomes operative. If the voltages set up at the resistances are comparatively high with respect to the voltage at the grid of the tube 4, at which said tube is blocked, this change is very abrupt. If, for example, it is assumed that in the blocked state of the tube 4 the voltage across the resistance 8 is 40 volts and that the alternating noise voltage is 35 volts R. M. S., then, in the absence of a signal, the voltage across the first condenser of the smoothing filter will be $$40-35\sqrt{2}=-10$$

volts. The tube 4 is then blocked or substantially inoperative. If, now, the noise voltage decreases by 20%, due to the reception of a carrier-wave of the correct frequency, the additional negative grid-bias of the low frequency amplifier tube 4 is $40-0.8\times35\sqrt{2}\approx40-40=0$ volts, so that said low-frequency tube is unblocked or completely open. The effect may be increased by applying the blocking voltage to the grids of any following low-frequency amplifying tubes. The optimum effect may be obtained by variation of the resistance 8.

The tube 6 preferably operates as a pure amplifier having a substantially constant grid-bias. In order that the voltage at the resistance 8 may be maintained more accurately at the optimum value, the upper end of said resistance may be connected by way of a resistance 23 to the screen grid of the tube 6.

The circuit-arrangement of the present invention further comprises means for preventing the control-grid of the tube 4 from acquiring a positive bias, in the case of a strong signal, which might lead to the occurrence of grid current and distortion. For this purpose use is made of a diode rectifier 24, the anode of which is connected to the point from which the low-frequency tubes obtain their grid voltages. For this purpose, as an alternative, the tube 4 may be a diode-pentode, the diode electrode fulfilling the said function. In this case it is desirable that the diode anode be biassed at about 1 volt positive with respect to the control grid since the diode does not become fully conductive until the voltage between anode and cathode exceeds about +1 volt, which, if allowed to be applied to the control grid, might produce undesired effects. An advantage of the circuit-arrangement is that a small number of additional discharge tubes is required.

It is to be understood that the invention is not limited to the details disclosed but includes all such variations and modifications as fall within the spirit of the invention and the scope of the appended claims.

What I claim is:

1. In a radio receiver including a detector whose output is fed to an amplifying channel and wherein the noise level at the output of the detector decreases substantially upon occurrence of a signal voltage, apparatus for suppressing noise in said receiver comprising a noise amplifying stage coupled to the output of said detector to produce a noise voltage in the absence of a signal voltage, said stage including an electron discharge tube having a cathode, a grid and an anode, means coupling said grid to the detector output to apply said noise voltage thereto, rectifying means including a first resistance coupled to said anode to produce a direct noise voltage across said first resistance, a second resistance connected between said cathode and ground to produce a substantially constant voltage, means connecting said first and second resistances in series for combining in opposite polarity said constant voltage and said noise voltage to produce a control voltage thereacross, and means to apply said control voltage to said amplifying channel to block same only during the existence of said noise voltage.

2. An arrangement, as set forth in claim 1, wherein said electron discharge tube further includes a screen grid, and a third resistance connected between said screen grid and the junction of said series-connected first and second resistances.

3. An arrangement, as set forth in claim 1, wherein said rectifying means includes a diode having a cathode common with the cathode of said tube and a plate incorporated in said tube, said first resistance being connected between said plate and said cathode, said plate being coupled to said anode.

4. An arrangement, as set forth in claim 1, further including a limiter diode coupled across said series-connected resistances to prevent said control voltage from exceeding a predetermined positive value.

References Cited in the file of this patent

UNITED STATES PATENTS

| | | |
|---|---|---|
| 2,343,115 | Noble | Feb. 29, 1944 |
| 2,370,216 | Worcester | Feb. 27, 1945 |
| 2,409,139 | Magnuski | Oct. 8, 1946 |
| 2,507,432 | Bass | May 5, 1950 |
| 2,527,617 | Berger | Oct. 31, 1950 |

OTHER REFERENCES

"Technical Discussion on the Application of the Type 55 Tube to Interchannel Noise Suppression"; Laboratory Series No. UL-4; August 25, 1932, RCA Radiotron Co. Manual, 5 pp. spec. 3 shts. Dwg.